US010208683B2

(12) United States Patent
Sixel et al.

(10) Patent No.: US 10,208,683 B2
(45) Date of Patent: Feb. 19, 2019

(54) ELECTRICAL MONITORING OF GASEOUS FUEL ADMISSION VALVES

(71) Applicant: Caterpillar Motoren GmbH & Co. KG, Kiel (DE)

(72) Inventors: Eike Joachim Sixel, Kiel (DE); Hannes Marscheider, Schüldorf (DE); Daniel Wester, Felde (DE); Arvind Sivasubramanian, Peoria, IL (US); Travis Barnes, Metamora, IL (US); Chris Gallmeyer, Peoria, IL (US); Jedediah A. Frey, Muskegon, MI (US); Andrew J. Neaville, Mt. Pulaski, IL (US); Robert Calderwood, Peoria, IL (US)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 0 days.

(21) Appl. No.: 14/639,978

(22) Filed: Mar. 5, 2015

(65) Prior Publication Data
US 2015/0252737 A1  Sep. 10, 2015

(30) Foreign Application Priority Data
Mar. 7, 2014  (EP) .................................. 14158264

(51) Int. Cl.
*F02D 19/02* (2006.01)
*F02D 41/22* (2006.01)
(Continued)

(52) U.S. Cl.
CPC ......... *F02D 19/026* (2013.01); *F02D 19/021* (2013.01); *F02D 19/025* (2013.01);
(Continued)

(58) Field of Classification Search
CPC ...... F02D 19/026; F02D 37/02; F02D 19/021; F02D 41/0025; F02D 41/221;
(Continued)

(56) References Cited

U.S. PATENT DOCUMENTS 3,202,839 A * 8/1965 Allmark ............ G01R 19/0038
327/18
5,615,655 A * 4/1997 Shimizu .................. F02D 37/02
123/344

(Continued)

FOREIGN PATENT DOCUMENTS

CN        102341580       2/2012
DE   10 2007 025 075 A1   4/2008
(Continued)

*Primary Examiner* — Joseph Dallo

(57) ABSTRACT

A method of evaluating operability of a gaseous fuel admission valve of an internal combustion engine is disclosed. The method includes operating the internal combustion engine on gaseous fuel by repeatedly actuating the gaseous fuel admission valve. The method further includes measuring a sequence of temporal developments of an electrical operation parameter respectively associated with an actuation of the gaseous fuel admission valve. The sequence includes a first temporal development to be evaluated and a plurality of temporal developments preceding the first temporal development. The method also includes evaluating operability of the gaseous fuel admission valve based on the first temporal development of the measured sequence and at least one of the plurality of preceding temporal developments of the measured sequence.

19 Claims, 5 Drawing Sheets

(51) Int. Cl.
  *F02D 41/24* (2006.01)
  *F02D 19/06* (2006.01)
  *F02D 41/00* (2006.01)
  *F02D 37/02* (2006.01)
  *F02D 41/20* (2006.01)

(52) U.S. Cl.
  CPC ............ *F02D 19/06* (2013.01); *F02D 37/02* (2013.01); *F02D 41/0025* (2013.01); *F02D 41/221* (2013.01); *F02D 41/2467* (2013.01); F02D 2041/2055 (2013.01); F02D 2041/2058 (2013.01); F02D 2041/224 (2013.01); *Y02T 10/32* (2013.01); *Y02T 10/36* (2013.01); *Y02T 10/40* (2013.01)

(58) Field of Classification Search
  CPC .... F02D 19/025; F02D 19/06; F02D 41/2467; F02D 2041/224; F02D 2041/2058; F02D 2041/2055; Y02T 10/32; Y02T 10/36; Y02T 10/40
  See application file for complete search history.

(56) References Cited

U.S. PATENT DOCUMENTS

| | | | | |
|---|---|---|---|---|
| 5,947,090 | A | * | 9/1999 | Maeda ................ F02D 41/20 123/490 |
| 6,571,774 | B2 | * | 6/2003 | Yomogida ............ F02D 41/062 123/456 |
| 9,329,101 | B2 | * | 5/2016 | Frohlich ................ F02D 41/20 |
| 2006/0186230 | A1 | * | 8/2006 | Adams ............... F02M 21/0269 239/585.1 |
| 2008/0148831 | A1 | | 6/2008 | Kekedjian et al. |
| 2011/0023836 | A1 | * | 2/2011 | Verner ................... F02D 41/20 123/490 |
| 2014/0095052 | A1 | * | 4/2014 | Frohlich ................ F02D 41/20 701/103 |
| 2016/0025593 | A1 | * | 1/2016 | Anderson .......... F02M 21/0272 73/114.36 |

FOREIGN PATENT DOCUMENTS

| | | |
|---|---|---|
| EP | 1 040 264 B1 | 7/1999 |
| EP | 2 818 674 A1 | 12/2014 |
| WO | WO 2012/167290 A1 | 12/2012 |

* cited by examiner

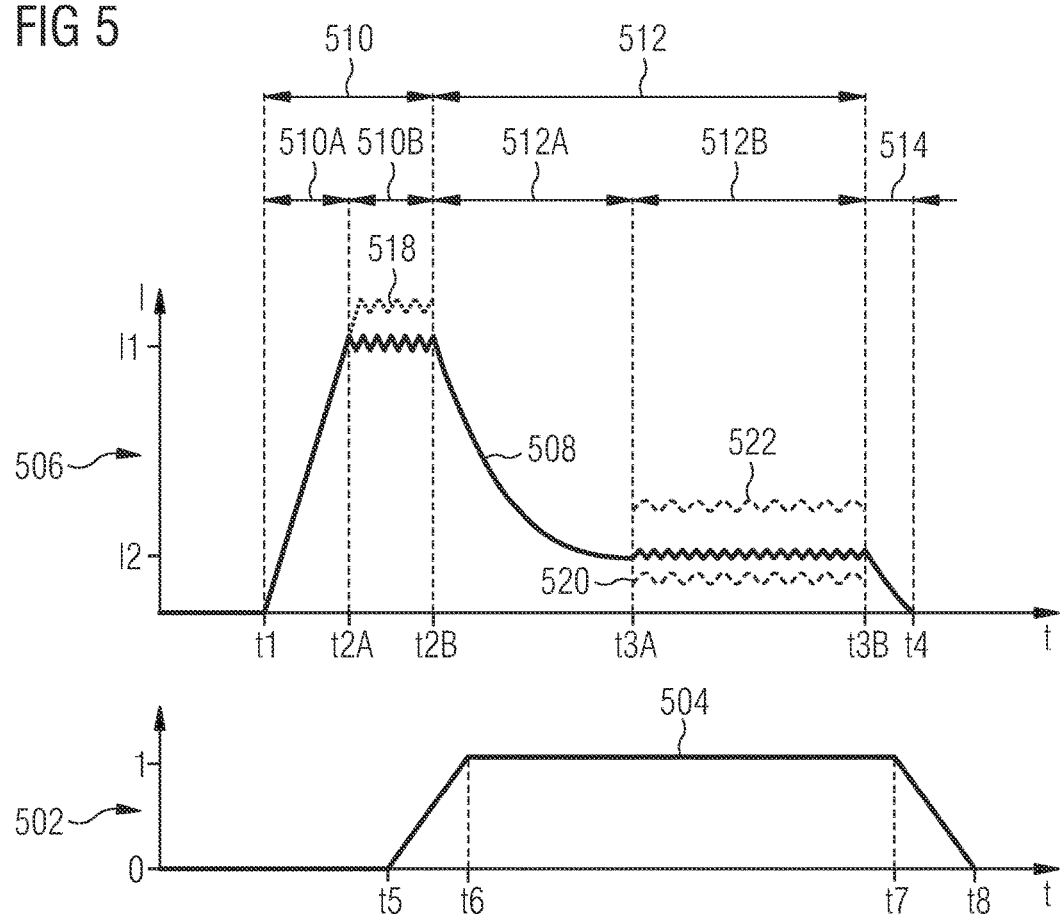

ELECTRICAL MONITORING OF GASEOUS FUEL ADMISSION VALVES

CLAIM FOR PRIORITY

This application claims benefit of priority of European Patent Application No. 14158264.3, filed Mar. 7, 2014, which is incorporated herein by reference.

TECHNICAL FIELD

The present disclosure generally relates to internal combustion engines operable with gaseous fuel, and more particularly to evaluating operability of a gaseous fuel admission valve of an internal combustion engine.

BACKGROUND

Internal combustion engines that can be operated at least partly on gaseous fuel include gaseous fuel internal combustion engines and dual fuel (DF) internal combustion engines. DF internal combustion engines can typically operate in a liquid fuel mode (LFM) and in a gaseous fuel mode (GFM). An exemplary DF internal combustion engine is disclosed, for example, in European Patent Application No. 13 174 377.5 by Caterpillar Motoren GmbH & Co. KG, GERMANY, filed on 28 Jun. 2013. In LFM, a liquid fuel, such as Diesel fuel or heavy fuel oil (HFO), is provided as the sole source of energy during combustion via a main liquid fuel injector. In GFM, a gaseous fuel such as natural gas is provided, for example mixed with air in an intake port of a cylinder. Ignition of the gaseous fuel may be performed with a small amount of liquid fuel that is, for example, injected directly into the cylinder via the same main fuel liquid injector or a separate ignition fuel injector.

In gaseous fuel internal combustion engines and DF internal combustion engines, for each cylinder at least one gaseous fuel admission valve, herein also referred to as gas admission valve (GAV) may be positioned between a source of gaseous fuel and an air intake of the engine. When a GAV is opened in GFM of the DF engine, or during operation of the gaseous fuel engine, the gaseous fuel passes into the air intake for mixing with the intake air.

An example of a solenoid actuated gaseous fuel admission valve is disclosed in European Patent 1 040 264 B1. Solenoid actuated GAVs include a solenoid coil, a movable plate, and a stationary plate or disc, whereby a current delivered to the solenoid coil actuates the valve by lifting the movable plate from the stationary plate.

Due to their positioning close to the combustion chamber, GAVs may be susceptible to contamination and increased wear. For example, during operation in LFM, the movable plate of a solenoid actuated GAV may dither on the stationary plate or disc of the closed gaseous fuel admission valve due to the combustion. Thereby, both movable plate and stationary plate or disc may be exposed to an increased wear. Furthermore, GAV may not only open in GFM but may also open during LFM. For example in case of a solenoid actuated GAV, a pressure difference between intake air and the gaseous fuel pipe system during LFM may result in opening. Then, small particulates may get trapped in the valve, for example, between the movable plate and the stationary plate or the seat of the solenoid actuated GAV and the valve may no longer close properly. Wear as well as contamination of the GAV may result in leakage, increased pass rate, or even a stuck open GAV.

The present disclosure is directed, at least in part, to improving or overcoming one or more aspects of prior systems.

SUMMARY OF THE DISCLOSURE

In one aspect of the present disclosure, a method of evaluating operability of a gaseous fuel admission valve of an internal combustion engine is disclosed. The method may comprise operating the internal combustion engine on gaseous fuel by repeatedly actuating the gaseous fuel admission valve. Further, the method may comprise measuring a sequence of temporal developments of an electrical operation parameter respectively associated with an actuation of the gaseous fuel admission valve. The sequence may comprise a first temporal development to be evaluated and a plurality of temporal developments preceding the first temporal development. The method may further comprise evaluating operability of the gaseous fuel admission valve based on the first temporal development of the measured sequence and at least one of the plurality of preceding temporal developments of the measured sequence.

In another aspect of the present disclosure an internal combustion engine is disclosed. The internal combustion engine may comprise a gaseous fuel system, a plurality of cylinders, and a gaseous fuel admission valve for each cylinder of the plurality of cylinders, fluidly connecting the gaseous fuel system with the respective cylinder. The internal combustion engine may further comprise a control unit configured to receive an electrical operation parameter for each gaseous fuel admission valve. The electrical operation parameter may be associated with an actuation of the respective gaseous fuel admission valve. The control unit may be further configured to perform a method as exemplary disclosed herein.

Other features and aspects of this disclosure will be apparent from the following description and the accompanying drawings.

BRIEF DESCRIPTION OF THE DRAWINGS

The accompanying drawings, which are incorporated herein and constitute a part of the specification, illustrate exemplary embodiments of the disclosure and, together with the description, serve to explain the principles of the disclosure. In the drawings:

FIG. 5 shows a two part diagram indicating an actuation of the GAV over time depending on a current drawn by the GAV over time.

DETAILED DESCRIPTION

Figure 1:
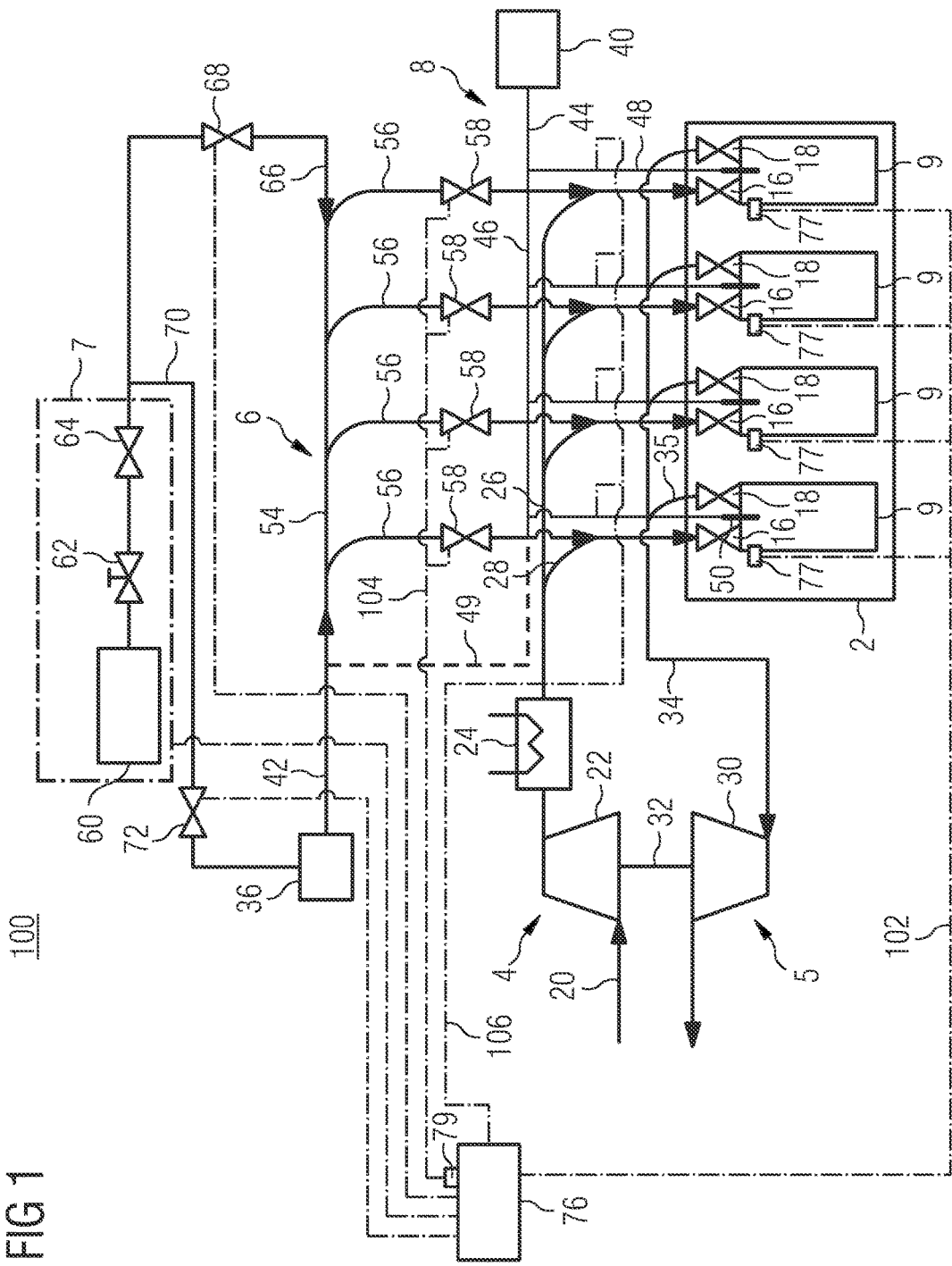
FIG. 1 shows a schematic drawing of an exemplary internal combustion engine operable at least partly on gaseous fuel.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

The present disclosure is based in part on the realization that a temporal development of an electrical operation parameter associated with an actuation of a gaseous fuel admission valve may be used for evaluating operability of the gaseous fuel admission valve. Particularly, during operation of the engine, a sequence of said temporal developments may be measured and recorded to facilitate comparisons between recent temporal developments and preceding developments. Thus, it may be possible to evaluate operability of a GAV based on the measured sequence. Particularly, deviations of a recent temporal development in comparison to preceding temporal developments may indicate a limited operability, or even inoperability of the GAV.

Internal combustion engines operable at least partly on gaseous fuel are described in the following in connection with FIGS. 1 to 3.

Figure 2:
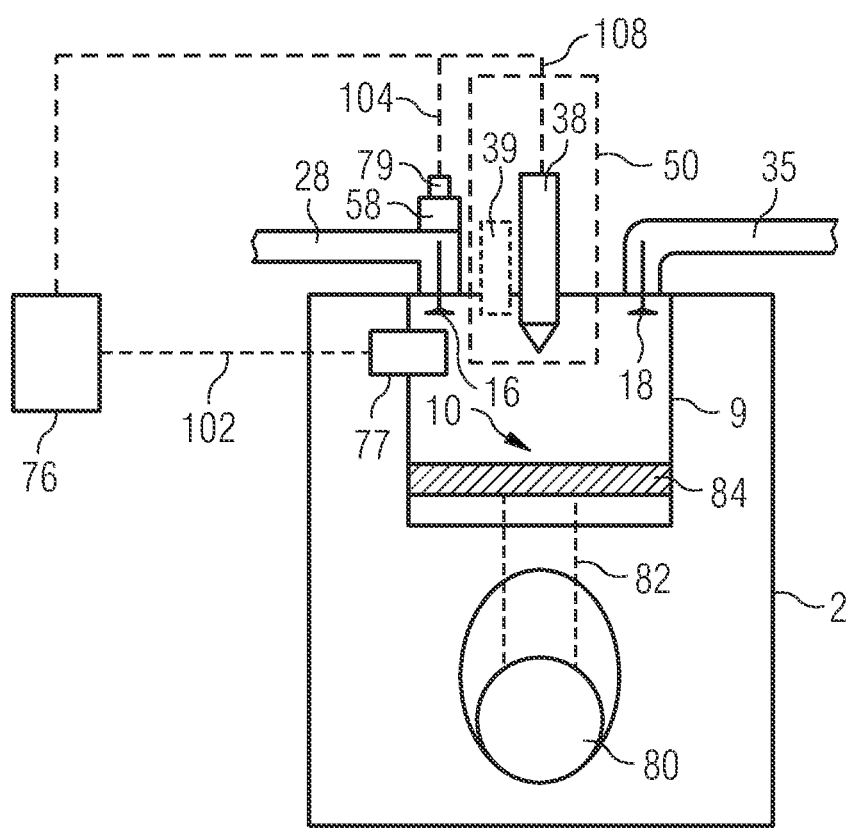
FIG. 2 shows a schematic cross-sectional view of a cylinder of a DF internal combustion engine.
Figure 3:
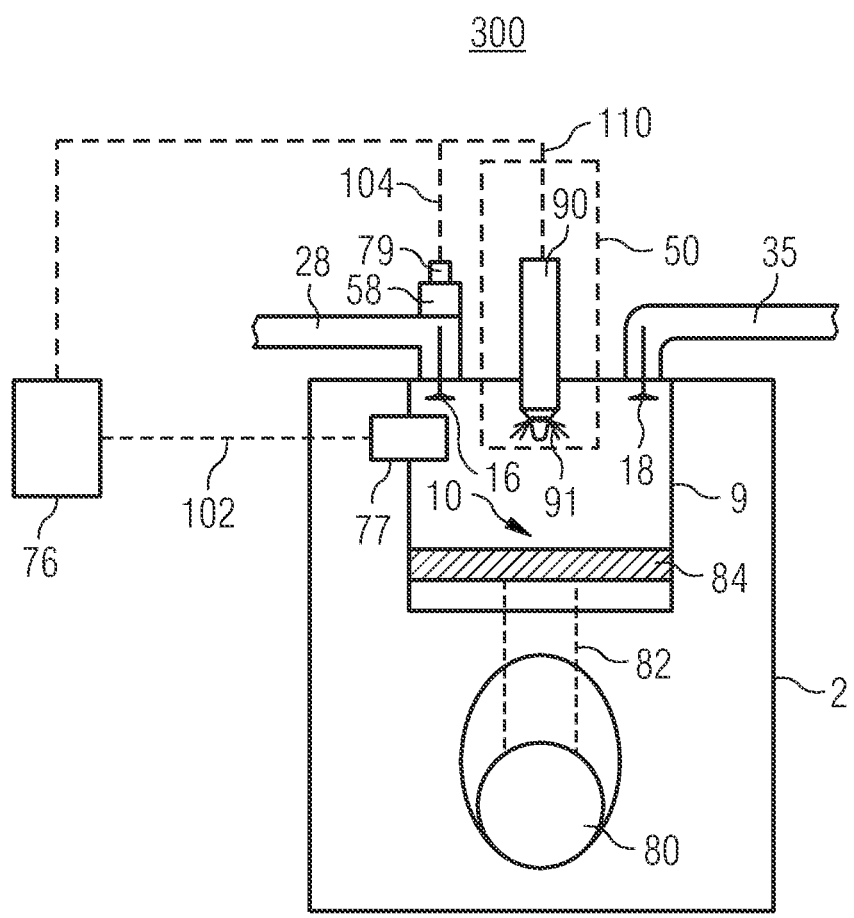
FIG. 3 shows a schematic cross-sectional view of a cylinder of a gaseous fuel internal combustion.

FIG. 1 shows schematically an exemplary internal combustion engine 100 operating at least partly on gaseous fuel, such as a DF engine (illustrated schematically in FIG. 2) or a gaseous fuel engine (illustrated schematically in FIG. 3).

Internal combustion engine 100 comprises an engine block 2, a charge air system 4, an exhaust gas system 5, a gaseous fuel system 6 including a purge gas system 7, and/or a liquid fuel system 8. Internal combustion engine 100 is powered with a gaseous fuel such as natural gas provided, for example, by an LNG-system, in a gaseous fuel mode (GFM), and may be powered with a liquid fuel such as, for example, diesel fuel in a liquid fuel mode (LFM) in dual fuel internal combustion engine configurations (particularly see FIG. 2).

Engine block 2 comprises a plurality of cylinders 9. Exemplarily, four cylinders 9 are depicted in FIG. 1. Engine block 2 may be of any size, with any number of cylinders, such as 6, 8, 12, 16 or 20, and in any cylinder configuration, for example, "V", in-line or radial configuration.

Each cylinder 9 is equipped with at least one inlet valve 16 and at least one outlet valve 18. Inlet valves 16 are fluidly connected to charge air system 4 and configured to provide charge air, or a mixture of charge air and gaseous fuel into cylinders 9. Analogous, outlet valves 18 are fluidly connected to exhaust gas system 5 and configured to direct exhaust gas out of respective cylinder 9.

Charge air is provided by charge air system 4 that may include an air intake 20, a compressor 22 to pressurize charge air, and a charge air cooler 24. A charge air manifold 26 is fluidly connected downstream of charge air cooler 24 to guide charge air via cylinder specific inlet channels 28 into respective cylinders 9.

Exhaust gas system 5 may include an exhaust gas turbine 30 drivingly connected to compressor 22 via a shaft 32. Additionally, an exhaust gas manifold 34 is arranged downstream of cylinders 9 for guiding exhaust gas from individual exhaust gas outlet channels 35 to exhaust gas turbine 30.

In some embodiments, charge air system 4 may comprise one or more charge air manifolds 26. Similarly, exhaust gas system 5 may comprise one or more exhaust gas manifolds 34.

In addition, inlet valves 16 and outlet valves 18 may be installed within inlet channels 28 and outlet channels 35, respectively. Inlet channels 28 as well as outlet channels 35 may be provided within a common cylinder head covering more than one cylinder 9, or individual cylinder heads provided separately for each cylinder 9.

Gaseous fuel system 6 comprises a gaseous fuel source 36 fluidly connected to gaseous fuel piping 42. Gaseous fuel source 36 constitutes a gaseous fuel feed for supplying gaseous fuel for combustion in GFM. For example, gaseous fuel source 36 comprises a gaseous fuel tank that contains natural gas in a pressurized state, and a gas valve unit. Said gas valve unit is configured to allow, to block, and/or to control flow from said gaseous fuel tank into gaseous fuel piping 42. The gas valve unit may comprise gaseous fuel control valves, gaseous fuel shut-off valves, and/or venting valves.

Gaseous fuel piping 42 is fluidly connected to a gaseous fuel manifold 54 which splits into a plurality of gaseous fuel channels 56. Each gaseous fuel channel 56 is fluidly connected to at least one of the plurality of inlet channels 28. To dose gaseous fuel into individual inlet channels 28, in each gaseous fuel channel 56, a gaseous fuel admission valve 58 is installed. In some embodiments, internal combustion engine 100 may comprise more than one gaseous fuel manifold 54.

Each gaseous fuel admission valve 58 is configured to allow or to block flow of gaseous fuel into an individual inlet channel 28 to mix with compressed charge air from charge air system 4 in GFM. Thus, cylinder specific mixing zones downstream of each gaseous fuel admission valve 58 are generated. For example, gaseous fuel admission valves 58 may be solenoid actuated gaseous fuel admission valves such as solenoid actuated plate valves, in which springs hold a lower surface of a movable disk against an upper surface of a stationary disk or plate. The two surfaces may be configured to provide a sealed relationship in a closed state of gaseous fuel admission valve 58. Each gaseous fuel admission valve 58 may be mounted to a cylinder head covering at least one cylinder 9.

Purge gas system 7 (indicated in FIG. 1 by a dashed dotted box) comprises a purge gas tank 60, a purge gas control valve 62, and a purge gas shut-off valve 64 connected in series. Purge gas tank 60 constitutes a purge gas source to flush gaseous fuel piping 42, gaseous fuel manifold 54, etc. with a purge gas, such as nitrogen in a pressurized state.

Purge gas system 7 may be fluidly connected to gaseous fuel system 6 at various locations. For example, in FIG. 1 a first connection 66 is disposed proximal to the gaseous fuel manifold 54. A second connection 70 is disposed proximal to gaseous fuel source 36. First shut-off valve 68 and second shut-off valve 72 can block or allow a purge gas flow through first connection 66 and second connection 70, respectively. Additional connections may be integrated, for example, in the gas valve unit of gaseous fuel source 36.

As previously mentioned, FIG. 1 generically illustrates a DF internal combustion engine as well as a gaseous fuel engine. In a DF internal combustion engine, liquid fuel system 8 comprises a liquid fuel tank 40 connected to liquid fuel piping 44. Liquid fuel tank 40 may comprise a first liquid fuel tank for storing a first liquid fuel, for example, heavy fuel oil (HFO), and a second liquid fuel tank for storing a second liquid fuel, for example, diesel fuel. Liquid fuel tank 40 constitutes a liquid fuel source for supplying liquid fuel for combustion in LFM. Additionally, liquid fuel tank 40 may constitute a liquid fuel source for supplying ignition fuel in GFM. As one skilled in the art will appreciate, in gaseous fuel internal combustion engines, a liquid fuel system may be provided for igniting a gaseous fuel air mixture in cylinder 9. Alternatively, a gaseous fuel internal combustion engine may not include a liquid fuel system as ignition is caused in a different manner, for example by a spark plug.

Liquid fuel piping 44 is fluidly connected to a liquid fuel manifold 46 which splits into a plurality of liquid fuel inlet channels 48. To dose liquid fuel into a combustion chamber of cylinder 9, in each liquid fuel inlet channel 48 a fuel injection system 50 is installed.

In a gaseous fuel internal combustion engine, such as a spark ignited gaseous fuel internal combustion system, fuel injection system 50 may be fluidly connected to gaseous fuel source 36 (indicated by a dashed line 49) instead of liquid fuel tank 40. In this embodiment fuel injection system 50 may comprise a pre-combustion chamber for providing spark ignited ignition flames 91 (see FIG. 3) to ignite the mixture of gaseous fuel and air.

Exemplary embodiments of fuel injection system 50 for DF and gaseous fuel internal combustion engines are described in more detail when referring to FIGS. 2 and 3, respectively.

As shown in FIG. 1, internal combustion engine 100 may further comprise a plurality of pressure sensors 77 mounted at each cylinder 9. Each pressure sensor 77 is configured to generate a signal corresponding to a temporal development of an internal cylinder pressure during the operation of the engine, for example, during combustion.

To control operation of engine 100, a control unit 76 is provided. Control unit 76 forms part of a control system of engine 100. Control unit 76 is configured to receive data of pressure sensor 77 via a readout connection line 102. Control unit 76 may further be configured to control various components of engine 100 such as gaseous fuel admission valves 58 via a control connection line 104 and fuel injection system 50 via a control connection line 106. Control unit 76 may further be configured to control valves of purge gas system 7. Alternatively, a second control unit (not shown) may be configured to control operation of engine 100. Further description of the control system and additional control lines between control unit 76 and other components of the engine, such as the fuel injection system 50, will be given in FIGS. 2 and 3.

A sensor 79, which is connected to control unit 76, is provided to measure an electrical operation parameter of each GAV 58 at least during actuation of the same. For example, sensor 79 may measure a temporal development of electric current value drawn by each GAV 58 during actuation as is described in greater detail later on.

In some embodiments, one sensor 79 may be configured to monitor all GAVs 58, in other embodiments, more than one sensor 79 may be provided, for example, one sensor per GAV.

Control unit 76 may further be connected to other sensors not shown in FIG. 1, such as engine load sensors, engine speed sensors, temperature sensors, NOx-sensors, or fuel-to-air ratio sensors provided for each individual cylinder or for a plurality of cylinders. Control unit 76 may also be connected to an operator panel (not shown) for issuing a warning to the operator, indicating a failure of engine 100, GAV 58 or the like.

FIG. 2 shows a cylinder 9 of a DF internal combustion engine 200 which is an exemplary embodiment of internal combustion engine 100 of FIG. 1. Elements already described in connection with FIG. 1 have the same reference numerals, such as engine block 2, control unit 76, pressure sensor 77, and cylinder 9.

Cylinder 9 provides at least one combustion chamber 10 for combusting a mixture of fuel and air, a piston 84, and a crankshaft 80 which is connected to piston 84 via a piston rod 82. Piston 84 is configured to reciprocate within cylinder 9.

Cylinder 9 is connected to charge air manifold 26 via inlet channel 28 and to exhaust gas manifold 34 via outlet channel 35 (see FIG. 1). Inlet valve 16 is disposed in inlet channel 28, and outlet valve 18 is disposed in outlet channel 35. Gaseous fuel admission valve 58 can supply gaseous fuel to combustion chamber 10 of cylinder 9.

FIG. 2 further illustrates fuel injection system 50 by a dashed box. When DF internal combustion engine 200 is operated in LFM, fuel injection system 50 is used to inject liquid fuel into combustion chamber 10, the liquid fuel being the sole source of energy. When DF internal combustion engine 200 is operated in GFM, fuel injection system 50 may be used to inject an ignition amount of liquid fuel into combustion chamber 10 to ignite a mixture of gaseous fuel and air. In GFM, fuel injection system 50 may therefore function as an ignition system.

In FIG. 2, an exemplary embodiment of such an ignition system is based on a main liquid fuel injector 38 for injecting a large amount of liquid fuel in LFM and an ignition amount of liquid fuel into combustion chamber 10 to ignite the mixture of gaseous fuel and air in GFM. In other embodiments, such as for heavy duty DF internal combustion engines, gaseous fuel ignition system may comprise a separate ignition liquid fuel injector 39 to inject the ignition amount of liquid fuel into combustion chamber 10 in GFM.

DF internal combustion engine 200 additionally comprises a control system including control unit 76. Control unit 76 is connected to main liquid fuel injector 38 via control connection line 108 and, in case of heavy duty DF internal combustion engines, also to ignition liquid fuel injector 39 via a separate control connection line (not shown).

In the embodiments shown in FIGS. 2 and 3, sensor 79 for measuring an electrical operation parameter of GAV 58 is directly coupled to GAV 58, and/or integrated in GAV 58. Alternatively, sensor 79 may, for example, form part of control unit 76 as schematically shown in FIG. 1.

FIG. 3 shows a cylinder 9 of a gaseous fuel internal combustion engine 300 being another exemplary embodiment of internal combustion engine 100 of FIG. 1. Elements already described in connection with FIGS. 1 and 2 have the same reference numerals. Gaseous fuel internal combustion engine 300 is similar to DF internal combustion engine 200 of FIG. 2, except for the components described in the following.

Fuel injection system 50 comprises a pre-combustion chamber 90. Pre-combustion chamber 90 is configured to receive a pre-mixture of gaseous fuel and air outside of combustion chamber 10. The pre-mixture of gaseous fuel and air is ignited, for example by a spark plug, to provide ignition flames 91 disposed into combustion chamber 10. Ignition flames 91 are used to ignite the mixture of gaseous fuel and air in combustion chamber 10. Control unit 76 is connected to pre-combustion chamber 90 via control connection line 110. Alternatively, fuel injection system 50 may be a spark plug for igniting the mixture of gaseous fuel and air via an electric discharge. In those embodiments, a fuel injection system as described in connection with FIG. 1 may be not necessary for the purpose of igniting the mixture of gaseous fuel and air.

In general, control unit 76 as disclosed in connection with FIGS. 1 to 3 may be a single microprocessor or multiple microprocessors that include means for controlling, among others, an operation of various components of internal combustion engine 100. Control unit 76 may be a general engine control unit (ECU) capable of controlling numerous functions associated with internal combustion engine 100 and/or its associated components. Control unit 76 may include all components required to run an application such as, for example, a memory, a secondary storage device, and a processor such as a central processing unit or any other means known in the art for controlling internal combustion engine 100 and its components. Various other known circuits may be associated with control unit 76, including power supply circuitry, signal conditioning circuitry, communication circuitry and other appropriate circuitry. Control unit 76 may analyze and compare received and stored data and, based on instructions and data stored in memory or input by a user, determine whether action is required. For example, control unit 76 may compare received pressure data from pressure sensor 77 with target values stored in memory, and, based on the results of the comparison, transmit signals to one or more components of the engine to alter the operation of the same.

INDUSTRIAL APPLICABILITY

Exemplary internal combustion engines suited to the disclosed methods are, for example, DF internal combustion engines of the series M46DF and M34DF manufactured by Caterpillar Motoren GmbH & Co. KG, Kiel, Germany. One skilled in the art will appreciate, however, that the disclosed method can be adapted to suit other internal combustion engines as well.

In the following, operation and control of internal combustion engines as exemplarily described with reference to FIGS. 1 to 3 are described in connection with FIGS. 4 to 6. For illustration purposes, the methods are disclosed with reference to structural elements disclosed in connection with FIGS. 1 to 3. However, the skilled person will understand that the respective steps can be performed on other embodiments as well.

Figure 4:
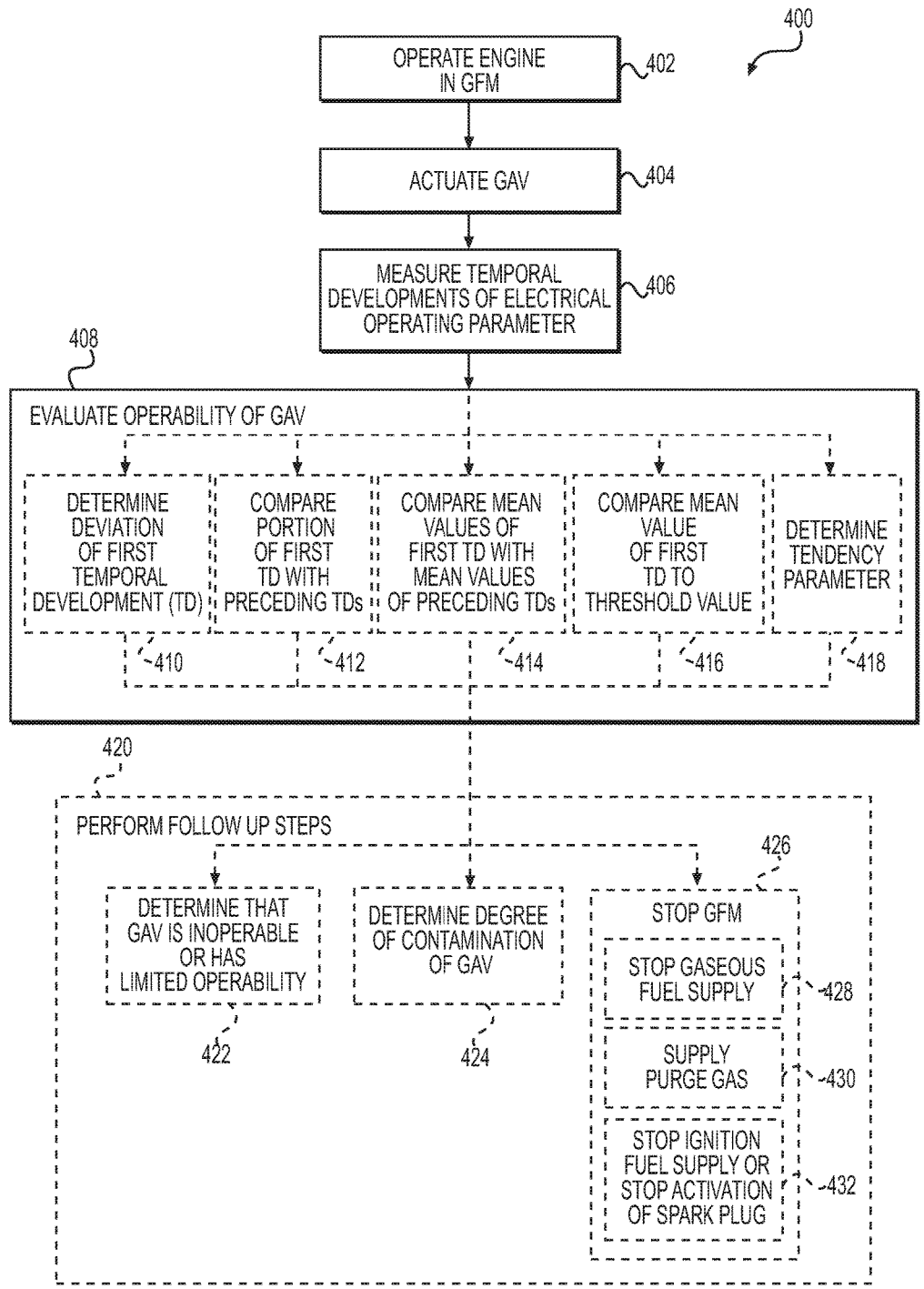
FIG. 4 shows a flow diagram of an exemplary method of evaluating operability of a GAV.

Referring to FIG. 4, a flow chart of an exemplary operating process 400 of internal combustion engine 100 is illustrated.

Operating process 400 starts at operating engine 100 in GFM on gaseous fuel (step 402). During operation, each GAV 58 is repeatedly actuated (step 404) to dose gaseous fuel into charge air for subsequently combusting the generated mixture in engine 100 during consecutive combustion cycles. Specifically, control unit 76 controls opening and closing of GAV 58 such that gaseous fuel from gaseous fuel source 36 mixes with charge air in inlet channel 28 to enter cylinder 9 during an intake stroke of a combustion cycle.

During operation (step 402) of engine 100 and actuation (step 404) of GAV 58, a sequence of temporal developments of an electrical operating parameter for each GAV is measured at step 406 as is described in greater detail later on. Each temporal development refers to a single actuation of an individual GAV 58. Moreover, the electrical operation parameter is associated with said actuation of GAV 58, for example indicating an electric power drawn by GAV 58 during actuation. The sequence comprises a plurality of temporal developments, one temporal development for each actuation of GAV 58. Of the plurality of temporal developments, a first temporal development, for example a recently measured temporal development, is evaluated in view of a plurality of preceding temporal developments to assess operability of GAV 58.

In some embodiments, the sequence of temporal developments may comprise temporal developments of consecutive combustion cycles, combustion cycles at preset or arbitrary intervals, combustion cycles with substantially similar engine parameters, or combinations thereof.

At step 408, operability of GAV 58 is evaluated based on the first temporal development of the measured sequence, and at least one of the plurality of preceding temporal developments of the measured sequence as exemplary described in detail in the following.

Under specific reference to the steps of actuating (step 404), measuring (step 406), and evaluating (step 408), operation of GAV 58 is illustrated in a schematic two-part diagram of FIG. 5 in greater detail for a single actuation. Here, as an example, the electrical operation parameter of GAV 58 is electric current drawn by GAV 58 during actuation of the same. Consequently, temporal developments of that electrical operation parameter is represented by an electric current curve over time.

In principle, a first chart 502 of FIG. 5 shows an actuation curve 504 of GAV 58 over time t for a single actuation. The actuation curve 504 includes a first state 0, which represents a fully closed state of GAV 58, and a second state 1, which represents a fully opened state of GAV 58. As GAV 58 does not instantaneously open and close, opened state 1 and closed state 0 are connected via a transition, in which the movable plate of GAV 58 moves from an origin position, for example of a closed state 0, to a desired position, for example opened state 1.

Furthermore, a second chart 506 of FIG. 5 shows an electric current curve 508 of GAV 58 over time t for a single actuation. As described herein, GAV 58 includes an electromagnet which causes opening of GAV 58 in an activated state. Said activated state is characterized by applying a voltage to GAV 58, particularly to the electromagnet thereof, such that GAV 58 draws an electric power to build up a magnetic field about the electromagnet to move the movable plate of GAV 58 into opened position 1.

The temporal development of current value I over time t during a single actuation (see current curve 508) may be divided into three sections 510, 512, 514 connected in series.

The first or opening section 510 extends between instants of time t1 and t2B. During opening section 510, GAV 58 is opened by energizing GAV 58. Particularly, current value I rises until a maximum value I1 at instant of time t2A during a first portion 510A of opening section 510. Subsequently, during a second portion 510B of opening section 510, current value I stays around I1 until reaching instant of time t2B. As can be seen in chart 502, during opening section 510, GAV 58 starts opening at instant of time t5. At this moment, the magnetic field of the electromagnet is strong enough to move the movable plate of GAV 58. For example, the movable plate is biased by a pressure difference across GAV 58, and may be further biased by retaining forces of springs in closed state 0. Those forces have to be exceeded to move the movable plate of GAV 58. GAV 58 reaches a fully opened state 1 at instant of time t6 which is typically proximate to instant of time t2B.

In the second or maintaining open section 512, GAV 58 is maintained open by maintaining GAV 58 energized. GAV 58 is maintained open for a desired time span between instants of time t2B and t3B to dose a desired amount of gaseous fuel into inlet channel 28 (see, for example, FIG. 1). The time span of maintaining open section 512 is controlled by control unit 76, for example, depending on an engine load, or an engine speed.

Maintaining open section 512 comprises a first portion 512A and a second portion 512B. During first portion 512A, current value I drops from I1 to I2 between instants of time t2B and t3A. Consecutively, during second portion 512B of maintaining open section 512, which extends between instants of time t3A and t3B, current value I of current curve 508 stays around I2.

As depicted, I1, which is required for opening GAV 58, is greater than I2, which is required for maintaining open GAV 58. One reason for such a behavior is that biasing forces resulting from the pressure difference across GAV 58 may be considerably lowered in an opened state 1 of the movable plate of GAV 58 compared to the closed state 0.

As soon as a voltage is no longer applied to GAV 58, which occurs at instant of time t3B, current I falls to a value of zero at instant of time t4 during a third or closing section 514. As a result of deenergizing GAV 58, the movable plate of GAV 58 moves from opened state 1 to closed state 0 at instants of time t7 and t8, respectively. As opening, and maintaining open of GAV 58 is controlled by control unit 76, also closing of GAV 58 is controlled by control unit 76.

It is noted that the given current curve 508 is exemplary only, but may in practice follow the depicted general profile. However, in practice, current curve 508 of GAV 58 strongly depends on several parameters such as a temperature of the electromagnet of GAV 58, a pressure difference across GAV 58, an absolute pressure value at GAV 58, an overall actuation time span of GAV 58, a voltage value applied to GAV 58, a contamination degree of GAV 58, a wear state of GAV 58, and many more.

As noted above, during operation of internal combustion engine 100, particles may get trapped between the sealing faces of GAV 58. Contamination of GAV 58 may result in various negative effects on operability of GAV 58. For example, leakage may occur, and/or movability of the movable plate of GAV 58 may be deteriorated. Moreover, trapped particles may even result in a stuck-close, or stuck-open GAV 58, the latter being seriously dangerous for man and machine as a large amount of gaseous fuel is continuously provided to an associated combustion chamber of internal combustion engine 100.

Contamination of GAV 58 may be caused by particles carried by charge air to GAV 58. Moreover, also dirt and particles resulting from maintenance work at internal combustion engine 100, for example at gaseous fuel source 36, gas piping 42, gaseous fuel manifold 54, and GAV 58, may result in deposits at GAV 58.

A limited operability of GAV 58, and also inoperability of GAV 58 may be detectable if monitoring an electrical power drawn by GAV 58 during actuation. For example, as described herein, it was realized that a current curve of an operable GAV 58 follows in principle a characteristic curve 508. A deviation from that curve 508 may, therefore, indicate a limited operability, or even inoperability of GAV 58.

However, as outlined herein, during operation of engine 100, a temporal development of an electrical operation parameter such as current curve 508 is strongly dependent on several operating parameters of engine 100. Due to this circumstance, it was realized that it may be difficult to determine if a measured temporal development of the electrical operating parameter indicates operability, or inoperability of GAV 58. To safely evaluate operability of GAV 58, one may have to measure not only the temporal development of the electrical operation parameter of GAV 58, but also at least all major influencing parameters. Hence, a control unit may include a huge multi-dimensional table including an acceptable temporal development for conceivable combinations of parameters. That multi-dimensional table may then serve as a look-up table to evaluate operability of GAV 58. However, such a control system may be very complex, error-prone and costly in terms of both hardware and software.

Evaluation of operability of GAV 58 may be also feasible by a far less complex method and system. Particularly, it was realized that a temporal development of an electrical operation parameter of GAV 58 reacts considerably fast on trapped particles in GAV 58. Consequently, evaluation of operability of GAV 58 can be based on a measured sequence of temporal developments of the electrical operation parameter during multiple actuations. Particularly, a to be evaluated first temporal development of GAV 58 may be evaluated based on at least one measured prior temporal development to determine temporal deviations without the need to measure several engine parameters, and/or to refer to a complex multi-dimensional evaluation table. Thus, as the engine parameters may not considerably change between the first to be evaluated temporal development of the electrical operation parameter of GAV 58 and those measured before, deviations between those temporal developments may indicate a limited operability of GAV 58, or even inoperability of the same.

In FIG. 5, examples of conceivable deviations are schematically indicated by dotted curves 518, 520, and 522. For example, current value I of curve 518 is higher than I1 of current curve 508 in opening section 510. This may be the case if particles are trapped in GAV 58 such that higher opening forces are required to open GAV 58.

As further examples, dotted current curves 520 and 522 are at current values below and above I2 of current curve 508, respectively, at maintaining open section 512. Current curve 520 may result from an at least partially stuck open GAV 58 in which particles are deposited such that a counterforce against the biasing forces of GAV 58 is generated such that less magnet force is required to maintain open GAV 58. Conversely, if particles may be trapped at a valve seat of the movable plate in the open position, GAV 58 may not open fully during actuation such that a gaseous fuel flowing through GAV 58 may still act onto the movable plate in direction to the closed position of GAV 58, which may result in curve 522.

Furthermore, a comparatively short opening section 510, and/or a comparatively short maintaining open section 512 of a temporal development to be evaluated may indicate that GAV 58 does not fully open during actuation due to trapped particles.

Moreover, a comparatively high current value I during opening section 510, and/or a comparatively long-lasting opening section 510 of a temporal development to be evaluated may indicate that the movable plate of GAV 58 rubs against trapped particles during movement.

Still further, a stuck-open GAV 58 may be indicated by a comparatively short maintaining open section 512, and/or a comparatively low current value I during second portion 512B of maintaining open section 512.

Referring again to FIG. 4, different exemplary method steps for evaluating operability of GAV 58 based on the sequence of temporal developments are referred to by dashed boxes 410 to 418.

At step 410, information on a temporal deviation of the first temporal development with respect to at least one of the plurality of preceding temporal developments may be provided to control unit 76 for further investigations.

Alternatively or additionally, opening section 510, maintaining open section 512, and/or closing section 514 of the first temporal development (see FIG. 5) and a respective section of at least one preceding temporal development of the measured sequence may be compared in method step 412. For example, deviations such as those referred to by reference numerals 518, 520, 522 as described in connection with FIG. 5, may be detected. First temporal development may also be compared to data derived from at least one preceding temporal development.

When comparing the first temporal development and preceding temporal developments, the comparison may be based on a mean value derived from a subgroup of, or all of the preceding temporal developments (method step 414).

Evaluation step 408 may also include a threshold analysis in step 416. Here, the first temporal development may be compared to a threshold value around a mean value of a subgroup of, or all of the preceding temporal developments of GAV 58.

In some embodiments, a tendency analysis may be carried out in a method step 418. In the tendency analysis, a tendency parameter may be derived from a subgroup of, or all of the preceding temporal developments. That tendency parameter may be compared to the first temporal development to evaluate operability of GAV 58.

For example, the subgroup referred to before may incorporate 3 to 50 preceding temporal developments, particularly temporal developments measured at similar engine parameters.

Evaluation step 408 may be further based on measured engine parameters such as an engine load, an engine speed, an inlet manifold pressure, a charge air pressure, a gaseous fuel manifold pressure, a charge air temperature, a combustion pressure, and/or a combustion temperature.

It is noted that the above described evaluation method steps are exemplary only, and may be adapted and modified by a person skilled in the art while maintaining the underlying principle of basing the evaluation on the measured sequence of temporal developments.

Based on evaluating step 408, a follow-up method step 420 may be performed, which includes determinations based on evaluation step 408 and reactions thereto.

For example, evaluation 408 may indicate that GAV 58 is inoperable, or GAV 58 may only have a limited operability, which may be determined at method step 422.

Based on evaluation 408, it may be also possible to determine a continuously increasing contamination degree of GAV 58 at step 424. For example, that contamination degree may be used to adapt a timing of GAV 58, and/or to predetermine when maintenance of GAV 58 may be necessary.

In some embodiments, GFM of a respective cylinder 9 associated with GAV 58 may be stopped at step 426, which may reduce or prevent damage to engine 100 if evaluation 408 indicates that GAV 58 may be stuck-open. Additionally, GFM of complete internal combustion engine 100 may be stopped, and/or engine 100 may be shut down based on evaluating step 408.

Stopping GFM (step 426) may include stopping supply of gaseous fuel from gaseous fuel source 36 at step 428. Additionally or alternatively, a purge gas from purge gas system 7 may be supplied upstream of GAV 58 (step 430).

In some embodiments, ignition in the respective cylinder 9 associated with GAV 58 having a limited operability may be prevented (step 432), for example to prevent ignition of too much fuel in cylinder 9 due to a stuck-open GAV 58. Preventing ignition of step 432 may include, for example, omitting supply of ignition fuel, or omitting activation of a spark plug.

In another aspect of the present disclosure, a method of evaluating operability of a gaseous fuel admission valve of an internal combustion engine is disclosed. The method may comprise operating the internal combustion engine, and, thereby, repeatedly actuating the gaseous fuel admission valve. The method may further comprise measuring a sequence of temporal developments of an electrical operation parameter respectively associated with an actuation of the gaseous fuel admission valve. The sequence may comprise a first temporal development to be evaluated and a plurality of temporal developments preceding the first temporal development. The method may further comprise evaluating operability of the gaseous fuel admission valve based on the first temporal development of the measured sequence and at least one of the plurality of preceding temporal developments of the measured sequence.

In some embodiments of the above aspect, the method step of operating the internal combustion engine may comprise operating the internal combustion engine in liquid fuel mode, gaseous fuel mode, or a transition between liquid fuel mode and gaseous fuel mode.

In some embodiments of the above aspect, the method may further comprise providing a gas, for example a purge gas or a gaseous fuel, upstream of the gaseous fuel admission valve to establish a positive pressure difference across the gaseous fuel admission valve.

One skilled in the art will appreciate that the above aspect may include any other embodiment as disclosed herein, where applicable. For example, the internal combustion engine of the above aspect may be a dual fuel internal combustion engine, or a gaseous fuel internal combustion engine.

Although the preferred embodiments of this invention have been described herein, improvements and modifications may be incorporated without departing from the scope of the following claims.

The invention claimed is:

1. A method for evaluating operability of a gaseous fuel admission valve of an internal combustion engine, the method comprising:
   operating the internal combustion engine on gaseous fuel by repeatedly
      actuating the gaseous fuel admission valve and burning the gaseous fuel in at least one cylinder of the internal combustion engine;
   measuring, using a sensor associated with the gaseous fuel admission valve, a plurality of temporal developments of an electrical operation parameter respectively associated with an actuation of the gaseous fuel admission valve, the plurality of temporal developments including a first temporal development to be evaluated, and a plurality of preceding temporal developments preceding the first temporal development; and
   determining, using a control unit, an operating condition of the gaseous fuel admission valve based on a comparison of the first temporal development and at least one preceding temporal development of the plurality of preceding temporal developments; and
   adjusting a supply of the gaseous fuel to the at least one cylinder of the internal combustion engine based on the determined operating condition,
   each temporal development of the plurality of temporal developments including at least one of
      an opening section, in which the gaseous fuel admission valve is moving open by energizing the gaseous fuel admission valve, and a closing section, in which the gaseous fuel admission valve is moving closed by deenergizing the gaseous fuel admission valve.

2. The method of claim 1, wherein the method step of determining the operating condition further comprises determining a temporal deviation of the first temporal development with respect to the at least one preceding temporal development of the plurality of preceding temporal developments.

3. The method of claim 1, wherein each temporal development of the plurality of temporal developments comprises:
the opening section;
a maintaining open section, in which the gaseous fuel admission valve is maintained open by maintaining the gaseous fuel admission valve energized; and
the closing section.

4. The method of claim 3, wherein the method step of determining the operating condition further comprises comparing at least one of the opening section, the maintaining open section, and the closing section of the first temporal development and a respective section of the at least one preceding temporal development of the plurality of preceding temporal developments.

5. The method of claim 1, wherein the method step of determining the operating condition further comprises at least one of:
comparing a first mean value of the first temporal development to a second mean value of a subgroup of preceding temporal developments of the plurality of preceding temporal developments; and
comparing the first mean value of the first temporal development to a threshold value associated with the second mean value of the subgroup of preceding temporal developments of the plurality of preceding temporal developments.

6. The method of claim 1, wherein the method step of determining the operating condition further includes deriving a tendency parameter from a subgroup of preceding temporal developments of the plurality of preceding temporal developments, and comparing the tendency parameter to the first temporal development.

7. The method of claim 1, further comprising at least one of:
determining the operating condition of the gaseous fuel admission valve as being inoperable;
determining the operating condition of the gaseous fuel admission valve as having a limited operability; and
determining a contamination degree of the gaseous fuel admission valve.

8. The method of claim 1, wherein adjusting the supply of the gaseous fuel includes stopping a gaseous fuel mode of the at least one cylinder associated with the gaseous fuel admission valve.

9. The method of claim 8, wherein stopping the gaseous fuel mode comprises at least one of:
stopping the supply of the gaseous fuel from a gaseous fuel source to the at least one cylinder of the internal combustion engine;
supplying a purge gas upstream of the gaseous fuel admission valve; and
preventing ignition in the at least one cylinder associated with the gaseous fuel admission valve.

10. The method of claim 1, wherein the plurality of temporal developments include temporal developments of at least one of
consecutive combustion cycles,
combustion cycles at predetermined intervals, and
combustion cycles with substantially similar engine parameters.

11. The method of claim 1, wherein the method step of determining the operating condition is further based on engine parameters, the engine parameters including at least one of an engine load, an engine speed, an inlet manifold pressure, a charge air pressure, a gaseous fuel manifold pressure, a charge air temperature, a combustion pressure, and a combustion temperature.

12. The method of claim 1, wherein the electrical operation parameter includes one of a current value and a voltage value of an electrical power drawn by the gaseous fuel admission valve during actuation of the gaseous fuel admission valve.

13. An internal combustion engine, comprising:
a gaseous fuel system;
a plurality of cylinders to receive gaseous fuel from the gaseous fuel system;
a plurality of gaseous fuel admission valves, each gaseous fuel admission valve of the plurality of gaseous fuel admission valves being associated with a cylinder of the plurality of cylinders, each gaseous fuel admission valve fluidly connecting the gaseous fuel system with a respective cylinder of the plurality of cylinders;
at least one sensor configured to measure an electrical operation parameter of each gaseous fuel admission valve of the plurality of gaseous fuel admission valves; and
a control unit configured to receive the electrical operation parameter for each gaseous fuel admission valve from the at least one sensor, the electrical operation parameter being associated with an actuation of a respective gaseous fuel admission valve of the plurality of gaseous fuel valves, and the control unit is further configured to perform a method including:
operating the internal combustion engine on gaseous fuel by repeatedly actuating the gaseous fuel admission valve and combusting the gaseous fuel in at least one cylinder of the plurality of cylinders;
measuring, using the at least one sensor, a plurality of temporal developments of the electrical operation parameter respectively associated with an actuation of each gaseous fuel admission valve, the temporal developments including a first temporal development to be evaluated and a plurality of preceding temporal developments preceding the first temporal development;
determining an operating condition of the gaseous fuel admission valve based on a comparison of the first temporal development and at least one preceding temporal development of the plurality of preceding temporal developments; and
adjusting a supply of the gaseous fuel to the at least one cylinder based on the determined operating condition,
each temporal development of the plurality of temporal developments including at least one of
an opening section, in which the gaseous fuel admission valve is moving open by energizing the gaseous fuel admission valve, and
a closing section, in which the gaseous fuel admission valve is moving closed by deenergizing the gaseous fuel admission valve.

14. The internal combustion engine of claim 13, wherein the internal combustion engine is configured as one of a dual fuel internal combustion engine and a gaseous fuel internal combustion engine.

15. The internal combustion engine of claim 13, further including a pressure sensor configured to generate a signal corresponding to a temporal development of a pressure within a cylinder of the plurality of cylinders.

16. The internal combustion engine of claim 13, wherein the control unit is further configured to determine at least one of:
   inoperability of the gaseous fuel admission valve;
   a limited operability of the gaseous fuel admission valve; and
   a contamination degree of the gaseous fuel admission valve.

17. The internal combustion engine of claim 13, wherein the control unit is further configured to stop a gaseous fuel mode of the at least one cylinder associated with a gaseous fuel admission valve of the plurality of gaseous fuel admission valves.

18. The internal combustion engine of claim 17, wherein the control unit is further configured to stop the gaseous fuel mode by performing one of:
   stopping a supply of gaseous fuel from a gaseous fuel source to the at least one cylinder of the internal combustion engine;
   supplying a purge gas upstream of the gaseous fuel admission valve; and
   preventing ignition in the at least one cylinder associated with the gaseous fuel admission valve.

19. The internal combustion engine of claim 13, wherein the electrical operation parameter is one of a current value and a voltage value of an electrical power drawn by a gaseous fuel admission valve of the plurality of gaseous fuel admission valves during actuation of the gaseous fuel admission valve.

* * * * *